United States Patent [19]
Watkins et al.

[11] Patent Number: 5,430,968
[45] Date of Patent: Jul. 11, 1995

[54] CONTROL SYSTEM FOR A FISHING LINE

[75] Inventors: Brian Watkins; Joel S. Dalton, both of Batavia; Harold F. Flannery, Cincinnati, all of Ohio

[73] Assignee: B-M-S- Control Systems, Inc., Cincinnati, Ohio

[21] Appl. No.: 23,386

[22] Filed: Feb. 26, 1993

[51] Int. Cl.⁶ ............................................. A01K 97/00
[52] U.S. Cl. ........................................................ 43/25
[58] Field of Search ............................................. 43/25

[56] References Cited

U.S. PATENT DOCUMENTS

| | | | |
|---|---|---|---|
| 2,791,858 | 5/1957 | Kernodle | 43/25 |
| 2,804,711 | 9/1957 | Kozar | 43/25 |
| 2,843,963 | 7/1958 | Butehorn | 43/25 |
| 3,045,380 | 7/1962 | Meredith | 43/25 |
| 3,069,800 | 12/1962 | Ransom | 43/25 |
| 3,256,633 | 6/1966 | Smith | 43/25 |
| 3,309,810 | 3/1967 | Hannon | 43/25 |
| 3,643,367 | 2/1972 | Denny | 43/25 |
| 4,539,773 | 9/1985 | Eldridge | 43/25 |
| 5,207,015 | 5/1993 | Kvarnström | 43/25 |

*Primary Examiner*—Kurt Rowan
*Attorney, Agent, or Firm*—William H. Holt

[57] ABSTRACT

A control system for a fishing line for use during casting and during reeling in a fish. A line-gripper member can either pinch the line to terminate casting or can apply a drag to assist in landing a fish. The control system is intended to be mounted on a fishing rod and is particularly useful in combination with a spinning reel but also is useful with a drum or rotating, spool-type reel. An operating member is mounted adjacent a handle of a fishing rod to be actuated, usually, by a user's thumb for pulling a control line for actuating a pivoted line-gripper member and provide contact with a fishing line to provide a brake action or drag thereto.

6 Claims, 4 Drawing Sheets

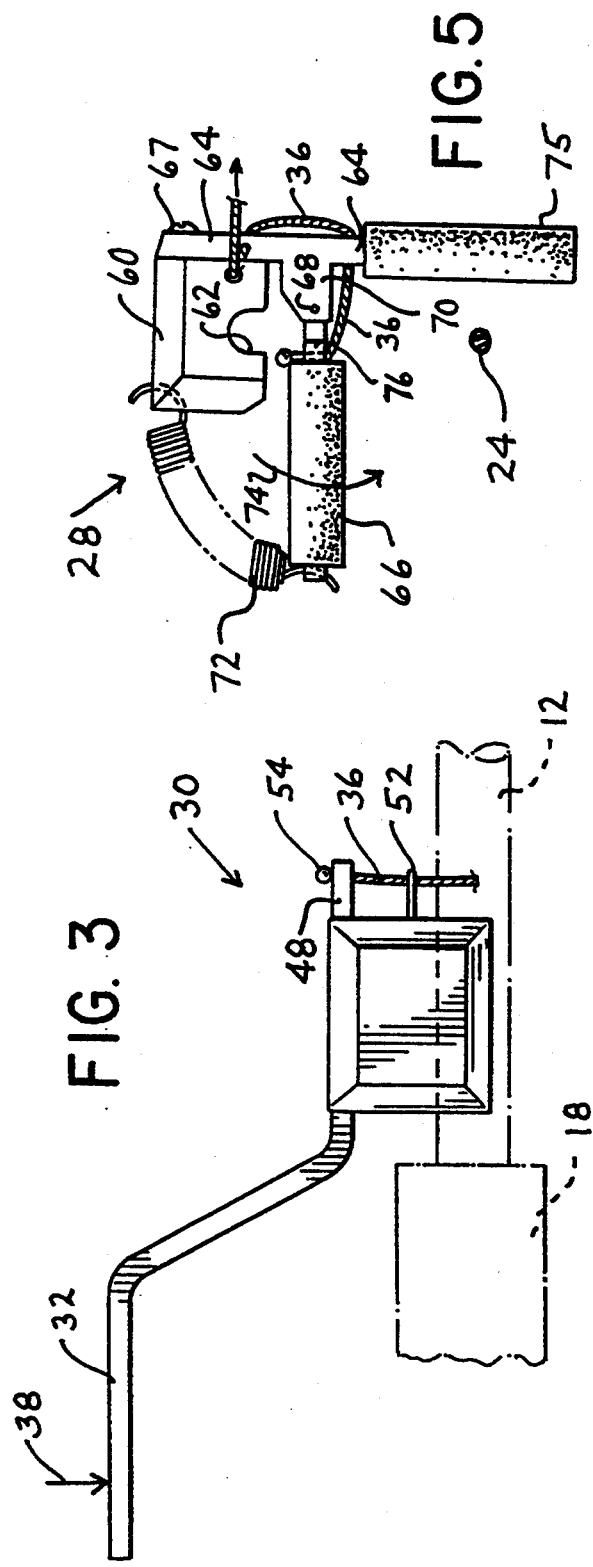
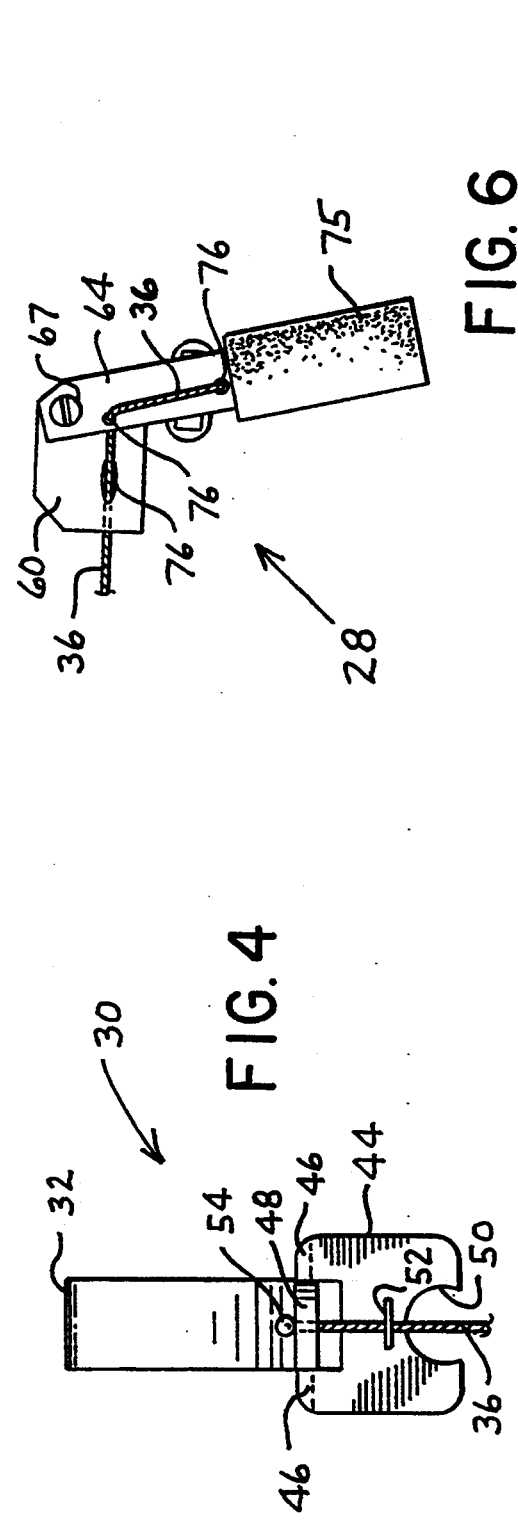

CONTROL SYSTEM FOR A FISHING LINE

This invention relates to a control system for use in combination with a fishing rod and fishing line, and more particularly for use with a spinning reel for providing improved control of said line during a casting operation or during the retrieval of fish.

BACKGROUND OF THE INVENTION

The sport of fishing includes as an integral part thereof the feature of precision casting of an artificial lure or bait-like member. A fishing reel of the type generally referred to as a spinning reel is somewhat more difficult for the user to control than the older style drum or rotating spool-type reel which can be readily controlled by the user's thumb being applied directly to line on the rotating spool in order to complete a precision cast. Likewise, the user's thumb can be used to apply a drag to a fishing line during retrieval of a fish much more readily with the spool-type reel than with the spinning-type reel.

SUMMARY OF THE INVENTION

The invention comprises a control system for use in combination with a fishing rod while engaged in the sport of fishing, the control system comprising a line-gripper member and an operating member, mounting means for mounting the line-gripper member on a fishing rod between a handle end and a tip end of the rod, the line-gripper member including a pair of pinch-members, mounting means for mounting the pinch-members for relative movement between opened and closed positions, mounting means for mounting the operating member adjacent the handle end of the fishing rod in spaced relation from the line-gripper member, and a control line connecting the operating member and the line-gripper member, the operating member including actuating means for actuating the control line for closing the pinch-members upon a fishing line.

It is an object of the invention to provide such a control system, as described above, to improve the skills of a fisherman whether such fisherman is a neophyte or one having professional skill.

The control system of the present invention is useful during a casting operation to increase control in stopping the line for providing precise control in the placement of a lure, or the like, at a desired location. Also, the control system is useful during the retrieval of a fish through the application of a drag to the fishing line to oppose the pull on the line created by the fish.

The present invention is also useful during loading of a fishing reel with line, or the rewinding of line onto the reel, by making it quite easy to apply a drag on the line and thereby avoiding a loose or slack winding of the line upon the reel.

BRIEF DESCRIPTION OF THE DRAWINGS

FIG. 3 is a side elevational view of an operating member mounted on a fishing rod adjacent a handle portion thereof.

FIG. 4 is a front elevational view of the operating member of FIG. 3.

FIG. 5 is an elevational view of one embodiment of a gripper-member and illustrates a pair of pinch-members held in open position by a tension spring.

FIG. 6 is a side elevational view of the gripper-member shown in FIG. 5.

DETAILED DESCRIPTION

Figure 1:
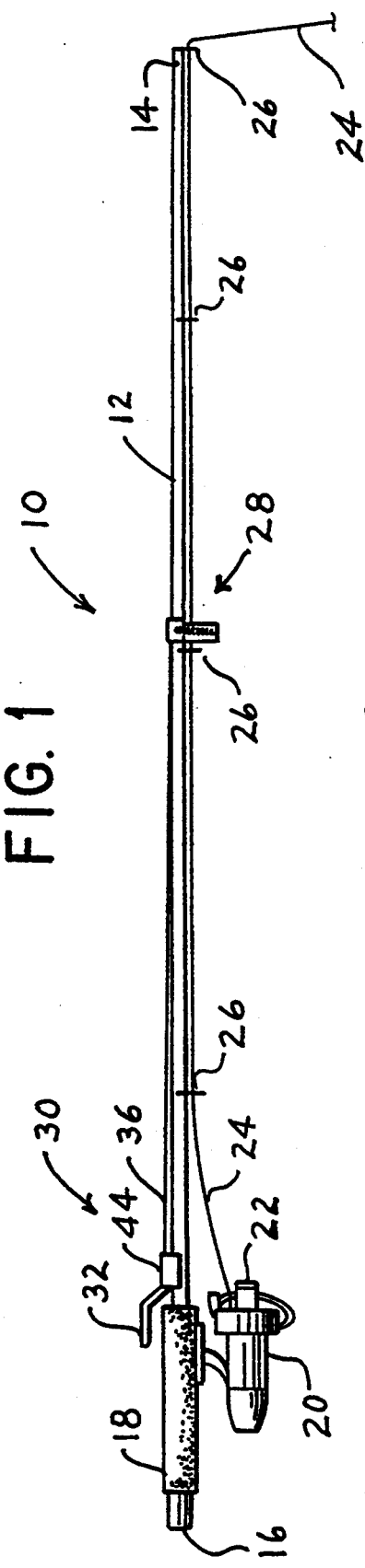
FIG. 1 is a side view of a fishing rod and reel and illustrates the control system of the present invention being carried thereby.

Referring to the drawings in detail, it will be seen that there is illustrated in FIG. 1 fishing equipment, generally indicated by the numeral 10, and including a fishing rod 12 having a tip end 14, a handle end 16 and a handle 18. The invention has a particular usefulness when used with a conventional spinning reel 20 having a standard, non-rotating spool 22 with a supply of fishing line 24 extending through a series of line guides, or eyelets, 26.

The invention is comprised of a line-gripper member, generally indicated by the numeral 28, mounted upon rod 12 intermediate tip end 14 and handle end 16, and spaced from an operating member, generally indicate by the numeral 30, which is mounted upon rod 12 adjacent to handle end 16. It is to be understood that the operating member 30, while shown as being mounted upon rod 12, may be mounted on or be part of handle 18. Operating member 30 includes an operating lever 32 which is pivotally mounted for being operated by a sportsman's thumb, or finger 34, for pulling upon and creating tension in a control line 36 to operate the gripper-member 28, in a manner best illustrated in FIG. 2. Pressure is applied by thumb 34 along arrow 38 to cause operating lever 32 to rotate about a pivot 40 in a direction shown by arrow 42.

Operating member 30 is, preferably, molded or otherwise formed of plastic material and provides a block-like portion 44 having a pair of spaced walls 46 for receiving pivot 40 and mounting in nested relation an end portion 48 of operating lever 32. Block-like portion 44 includes a longitudinally extending slot 50 which is arcuate in section and adapted to be slidably positioned and securely engaged with rod 12 which is constructed with an increasing taper from tip end 14 toward handle end 16.

Referring to FIGS. 3 and 4, it will be seen that control line 36 is threaded through end portion 48 of lever 32 and contained by a guide eyelet 52 fastened to block portion 44 of operating member 30. Control line 36 is constrained by a bead-end 54 such that a downward force along arrow 38 will create an upward pull upon line 36.

Figure 2:
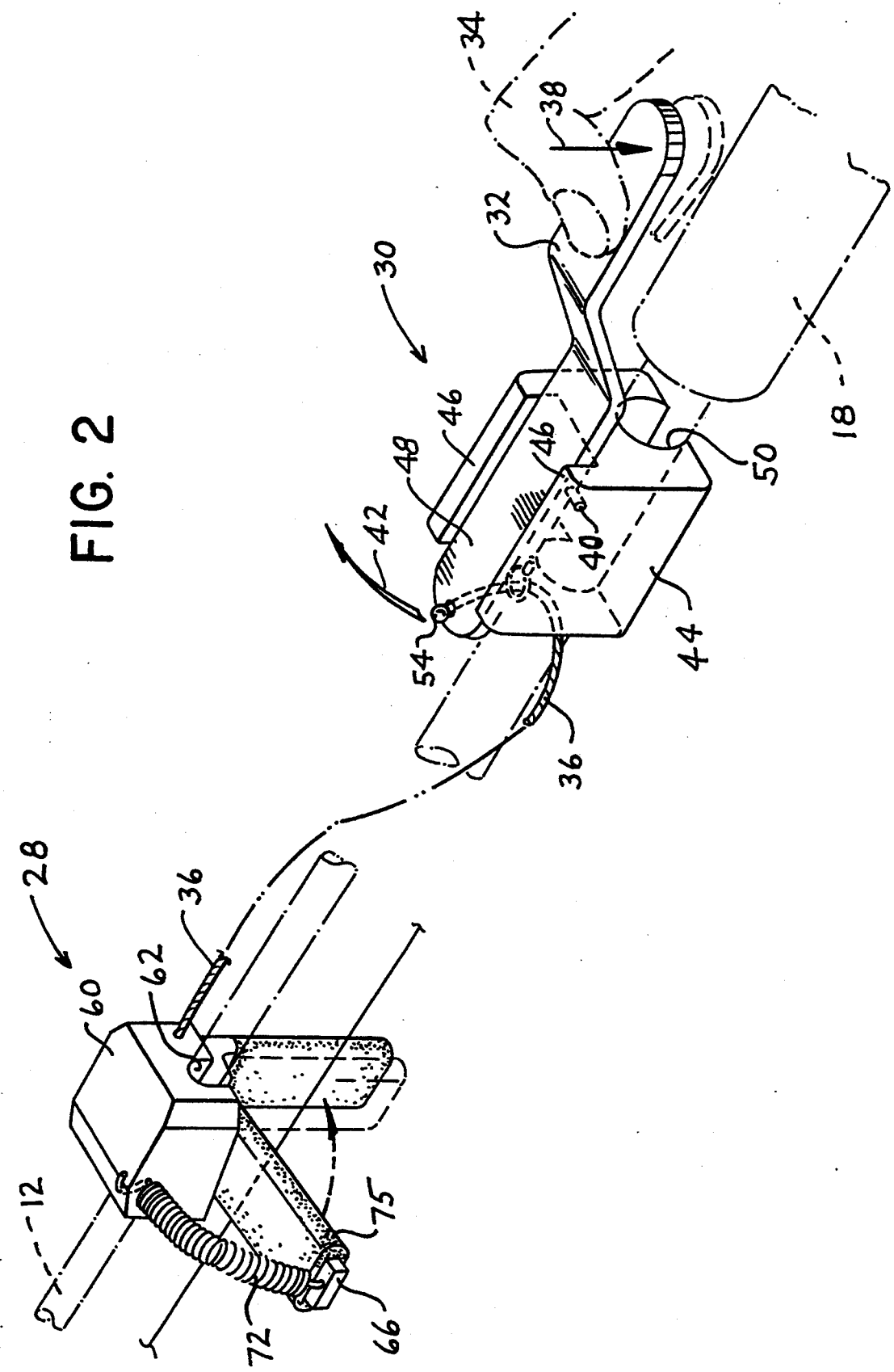
FIG. 2 is an enlarged fragmentary view showing a close-up view of one form of the present control system including a line-gripper member and an operating member connected together by a control line.

As is best shown in FIGS. 2, 5 and 6, line-gripper member 28 is comprised of a block-like body 60 and includes a longitudinally extending, arcuate in section, slot 62 for adjustably positioning body 60 on tapered fishing rod 12 in a preferred location closely adjacent to one of the series of line guides 26 (see FIG. 1). Line-gripper member 28 includes a pair of pinch-members comprised of a first pinch member 64 and a second pinch-member 66 which, as will be seen hereafter, are relatively movable under the influence of control line 36 for acting upon fishing line 24. First pinch-member 64 could be formed integral with body 60 but can also be fixedly secured thereto by a fastener 67. Second pinch-member 66 is mounted for movement relative to first pinch-member 64 and/or body 60 by being pivoted at 68 to an arm 70 extending from member 64. A tension spring 72 holds member 66 in spaced relation from member 64 until pulled in the direction of arrow 74, as shown in FIG. 5, by movement of control line 36. Pinch-member 66 is brought into contact with fishing line 24 adjacent to fixed pinch member 64 to apply a drag to line 24 and/or brake movement thereof by pinching it against member 64. Pinch-members 64 and 66 are preferably provided with a sleeve or coating of frictional material such as a rubber-like sleeve 75 for contact with line 24. Control line 36 is preferably threaded through a series of pilot holes, or guides 76, which are drilled or otherwise formed in body 60 and members 64 and 66, as is shown in FIGS. 2, 5 and 6.

Figure 7:
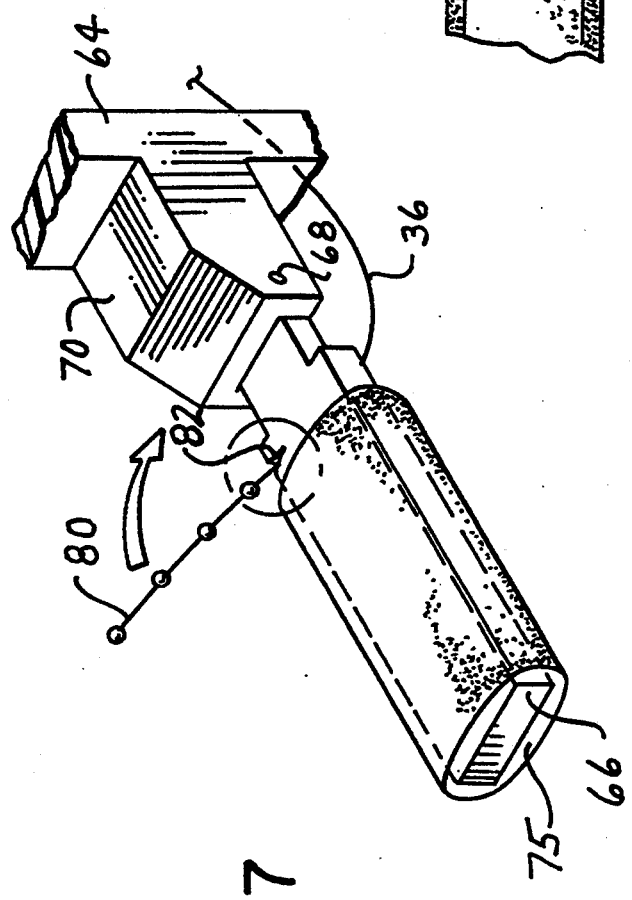
FIG. 7 is an enlarged fragmentary view showing a pivotable portion of the gripper-member of FIGS. 5 and 6 and illustrating a means for adjusting tension in a control line.
Figure 8:
FIG. 8 is an enlarged fragmentary showing of the encircled portion of FIG. 7.

FIGS. 7 and 8 illustrate one manner for adjusting the tension in control line 36 so that it is held in taut condition. Positioning of line-gripper member 28 and operating member 30 will vary depending upon the individual characteristics of various brands of fishing rods 12. As a result, it is not possible to predetermine the exact spacing between these members. A beaded-line segment 80 is shown at a terminal end of control line 36 such that it can be adjustably positioned in a slot 82 provided in pinch-member 66. Thus, once line-gripper member 28 and operating member 30 are secured to rod 12, control line 36 is made taut by adjusting segment 80 with respect to slot 82.

Figure 10:
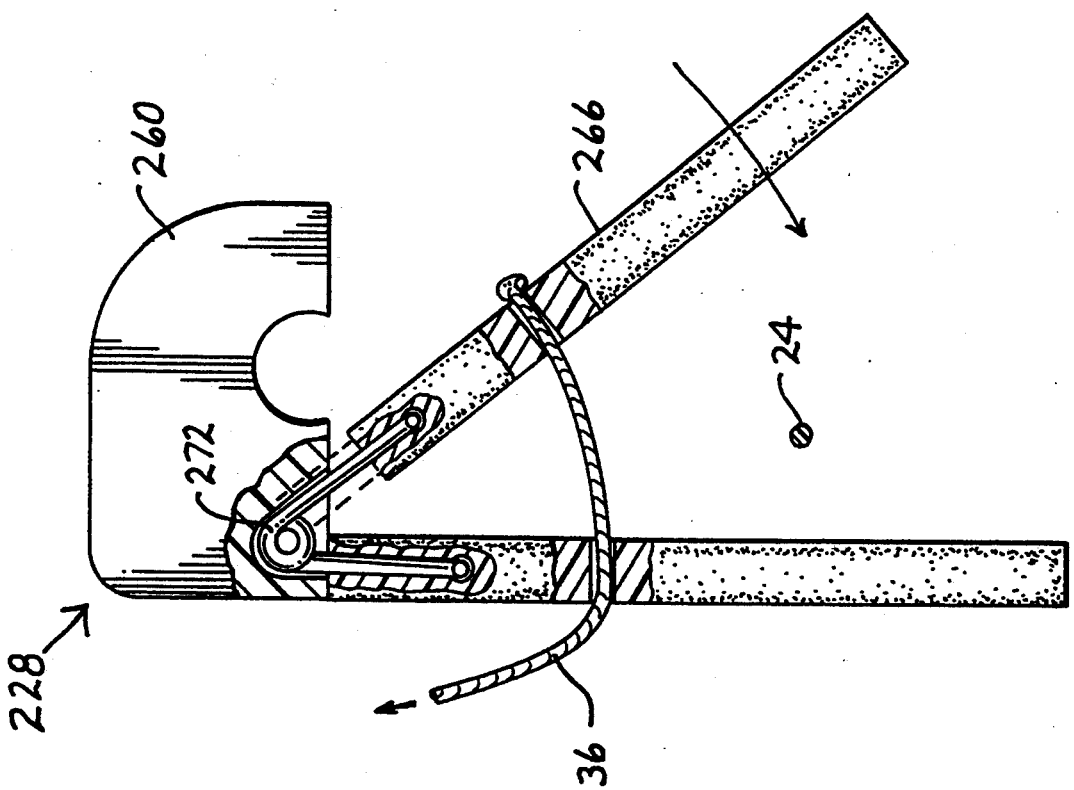
FIG. 10 is an enlarged elevational view, similar to FIG. 9, showing a third embodiment of a gripper-member in accordance with the present invention.
Figure 9:
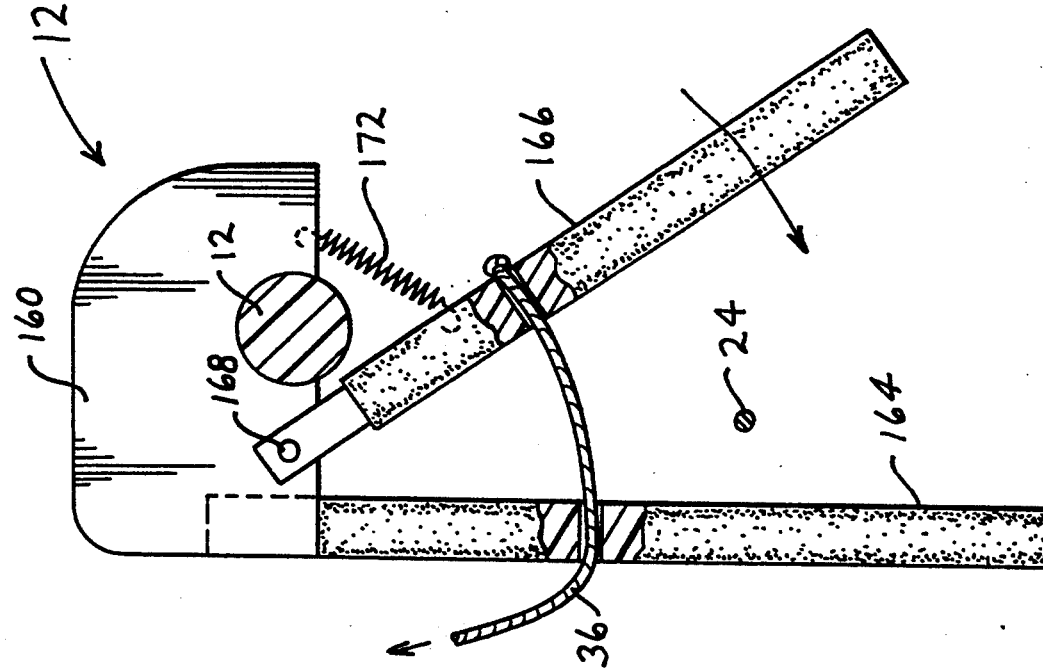
FIG. 9 is an enlarged elevational view of a second embodiment of a gripper-member shown in position for being closed upon a fishing line.

FIGS. 9 and 10 illustrate two addition embodiments of the invention showing possible variations of, or modifications to, line-gripper member 28.

In FIG. 9, a line-gripper member, generally indicated by the numeral 128, if secured upon fishing rod 12 in the same manner as described with regard to member 28. A first pinch-member is fixedly secured to, or may be integral with, a block-shaped body member 160. A second pinch-member 166 is pivotally connected at 168 to body member 160 so that a pull upon control line 36 causes member 166 to be brought into contact with fishing line 24 for creating a drag or braking action thereon. Pinch-member 166 is held in an open position by a tension spring 172 that has its ends suitably hooked in openings in, or otherwise connected to, members 160 and 166.

The embodiment shown in FIG. 10 comprises a line-gripper member, generally indicated by the numeral 228, which includes a body member 260, a first pinch-member 264 secured thereto, and a movably mounted second pinch-member 266 that is secured to one leg of a compression spring 272 that is carried by member 260. Compression spring 272 holds member 266 in an open position in spaced relation to pinch-member 264 and fishing line 24 until a suitable pull upon control line 36 closes pinch-member 266 upon line 24 for applying a drag or braking action thereto.

While several forms of the invention have been shown in the accompanying drawings and described in detail above, it is to be understood that various changes and modifications can be made in the shape and arrangement of parts without departing from the spirit and scope of the invention as defined by the appended claimed subject matter.

We claim:

1. A control system for use in combination with a fishing rod while engaged in the sport of fishing; said control system comprising a line-gripper member and an operating member; mounting means for mounting said line-gripper member on a fishing rod between a handle end and a tip end of said rod; said line-gripper member including a pair of pinch-members for direct engagement with a fishing line, mounting means for mounting said pinch-members for relative movement between opened and closed positions; mounting means for mounting said operating member adjacent the handle end of the fishing rod in spaced relation from said line-gripper member; a control line connecting said operating member and said line-gripper member; said operating member including actuating means for tensioning said control line for closing said pinch-members upon a fishing line, said pair of pinch members including means for providing pivotal movement between said opened and closed positions under the influence of said control line, sand spring means carried by said line-gripper member for normally holding said pinch-members in spaced relation.

2. A control system as defined in claim 1 wherein said spring means is comprised of a tension spring.

3. A control system as defined in claim 1 wherein said spring means is comprised of a compression spring.

4. A combination of a fishing rod and a control system for use while engaged in the sport of fishing, said control system comprising a line-gripper member and an operating member; mounting means for mounting said line-gripper member on a fishing rod between a handle end and a tip end of said rod; said line-gripper member including a pair of pinch-members for direct engagement with a fishing line, mounting means for mounting said pinch-members for relative movement between opened and closed positions; mounting means for mounting said operating member adjacent the handle end of the fishing rod in spaced relation from said line-gripper member; a control line connecting said operating member and said line-gripper member; said operating member including actuating means for tensioning said control line for closing said pinch-members upon a fishing line; said combination including said line-gripper member and said operating member being secured to said fishing rod by their respective mounting means, said fishing rod having at least one fishing line line-guide intermediate the length of said rod, and said line-gripper member being secured to said rod adjacent to said line-guide for maintaining said fishing line in a space between said pair of pinch members; said fishing rod including a tapered portion extending along its length and increasing in diameter from said tip end toward said handle end, said mounting means for mounting said operating member comprising an arcuate slot in said operating member for receiving said tapered portion therein and providing a frictional fit for securing said operating member to said fishing rod.

5. A combination of a fishing rod and a control system for use in the sport of fishing; said control system comprising a line-gripper member and an operating member; mounting means for mounting said line-gripper member on a fishing rod between a handle end and a tip end of said rod; said line-gripper member including a pair of pinch-members, mounting means for mounting said pinch-members for relative movement between opened and closed positions; mounting means for mounting said operating member adjacent the handle end of the fishing rod in spaced relation from said line-gripper member; a control line connecting said operating member and said line-gripper member; said operating member including actuating means for actuating said control line for closing said pinch-members upon a fishing line, said combination including said line-gripper member and said operating member being secured to said fishing rod by their respective mounting means, said fishing rod having at least one fishing line line-guide intermediate the length of said rod, and said line-gripper member being secured to said rod adjacent to said line-guide for maintaining said fishing line in a space between said pair of pinch-members, said control line including bead means located along its length, and means on said line-gripper member cooperating with said bead means for creating tension in said control line, said bead means comprising a series of beads located along the length of said control line, and said means on said line-gripper member cooperating with said bead means being comprised of a slot for receiving said control line and precluding passage therethrough of said bead means.

6. A control system for use in combination with a fishing rod while engaged in the sport of fishing; said control system comprising a line-gripper member and an operating member; mounting means for mounting said line-gripper member on a fishing rod between a handle end and a tip end of said rod; said line-gripper member including a pair of pinch-members for direct engagement with a fishing line, mounting means for mounting said pinch-members for relative movement between opened and closed positions; mounting means for mounting said operating member adjacent the handle end of the fishing rod in spaced relation from said line-gripper member; a control line connecting said operating member and said line-gripper member; said operating member including actuating means for tensioning said control line for closing said pinch-members upon a fishing line, said control line including bead means located along its length, and means on said line-gripper member cooperating with said bead means for creating tension in said control line, said bead means comprising a series of beads located along the length of said control line, and said means on said line-gripper member cooperating with said bead means being comprised of a slot for receiving said control line and precluding passage therethrough of said bead means.

* * * * *